Figure 1:
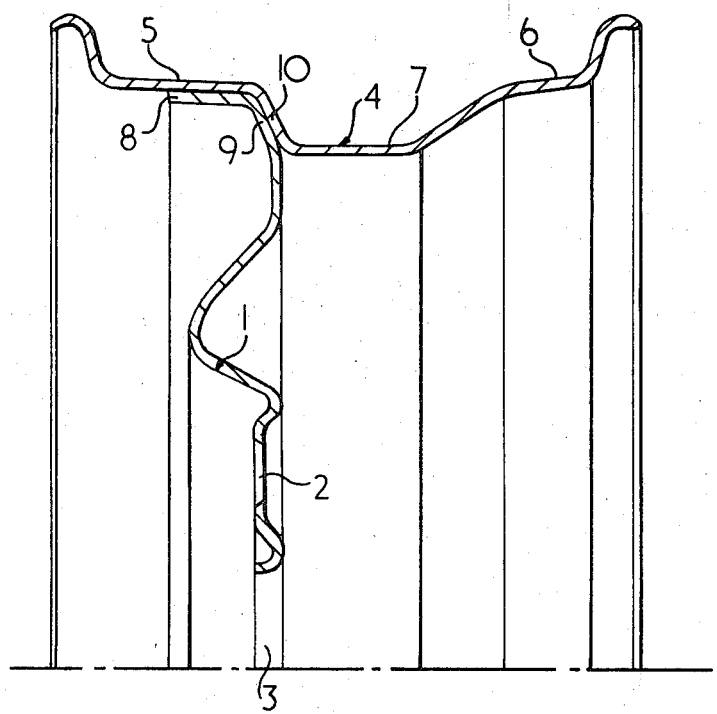

United States Patent [19]
Mitchell

[11] 3,827,756
[45] Aug. 6, 1974

[54] WHEELS
[75] Inventor: William E. Mitchell, Coventry, England
[73] Assignee: Dunlop Limited, London, England
[22] Filed: Jan. 21, 1972
[21] Appl. No.: 219,794

[30] Foreign Application Priority Data
    Jan. 25, 1971  Great Britain...................... 3116/71

[52] U.S. Cl.............................. 301/63 R, 301/37 P
[51] Int. Cl............................................ B60b 7/00
[58] Field of Search ............ 301/63 R, 63 PW, 37 P

[56] References Cited
    UNITED STATES PATENTS

| | | | |
|---|---|---|---|
| 1,652,214 | 12/1927 | Putnam | 301/63 R |
| 1,714,622 | 5/1929 | Putnam | 301/63 R |
| 1,871,619 | 8/1932 | Koyen | 301/37 P |
| 2,148,995 | 2/1939 | Nelson | 301/37 P |
| 2,809,869 | 10/1957 | Forbush | 301/97 |
| 3,356,421 | 12/1967 | Trevarrow | 301/37 P |
| 3,612,614 | 10/1971 | Ware | 301/63 R |
| 3,669,501 | 6/1972 | Derleth | 301/63 R |
| 3,756,658 | 9/1973 | Adams | 301/37 R |

OTHER PUBLICATIONS
Exiter, Advertising Brochure of Motor Wheel Corp., Lansing, Mich. printed 3-1970.

*Primary Examiner*—Richard J. Johnson
*Attorney, Agent, or Firm*—Stevens, Davis, Miller & Mosher

[57] ABSTRACT

A vehicle wheel comprising a rim portion provided with axially spaced circumferentially extending tire bead seating regions and a rim well region positioned there-between, and a central disc portion the outer periphery of which is provided with a flange turned axially outwardly, that is, towards the outboard side of the wheel, the flange being secured to the rim portion under the axially outer tire bead seating region and the region of the disc portion adjacent the flange being arranged to be located by the outboard side of the rim well against axially inward movement relative to the rim portion, of which the following is a specification.

13 Claims, 2 Drawing Figures

WHEELS

This invention relates to vehicle wheels for use with pneumatic tires and is particularly, though not exclusively, concerned with providing a wheel which will serve as a basic structural component for use as part of a composite decorative or "styled" automobile wheel in which a decorative plastics facing is applied to the outboard side of the wheel, that is, the side of the wheel exposed to view when the wheel is mounted on a vehicle.

One object of the present invention is to provide an improved vehicle wheel construction in which a central disc portion is secured to a rim portion in such a manner as to give a good resistance to buckling and ovalization and in which a good clearance for the mounting of an associated brake or other components is provided in the central disc portion of the wheel.

According to one aspect of the present invention a vehicle wheel comprises a rim portion provided with axially spaced circumferentially extending tire bead seating regions and a rim well region positioned therebetween, and a central disc portion the outer periphery of which is provided with a flange turned axially outwardly, that is, towards the outboard side of the wheel, the flange being secured to the rim portion under the axially outer tire bead seating region and the region of the disc portion adjacent the flange being arranged to be located by the outboard side of the rim well against axially inward movement relative to the rim portion.

A wheel in accordance with the present invention is particularly suitable for use as the basic structural component of a decorative or "styled" composite wheel. When used in this manner at least a portion of the outboard wheel disc and rim portions may be provided with a plastics facing member bonded or otherwise secured thereto.

Figure 2:
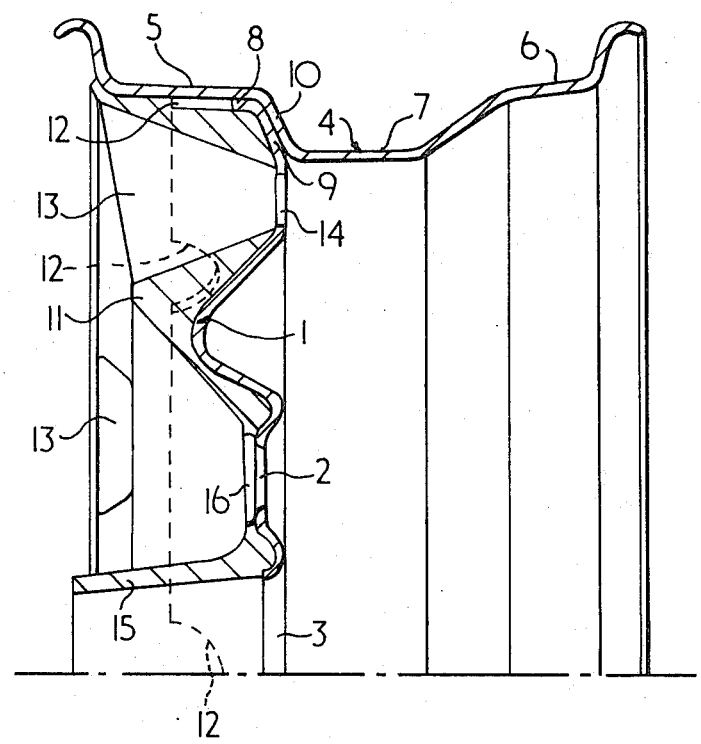

Several embodiments of the present invention will now be described by way of example with reference to the accompanying drawings in which:

FIG. 1 is a radial half section of a wheel in accordance with the present invention, and FIG. 2 is a radial half section of a "styled" composite wheel in accordance with the present invention.

A wheel in accordance with the present invention, as shown in FIG. 1, comprises a central disc portion 1 provided with apertures 2 to accommodate fixing nuts or studs (not shown) and a central aperture 3 to fit over the associated hub bearing cap (not shown), and a rim portion 4 provided with axially spaced circumferentially extending tire bead seating regions 5 and 6 and a well region 7 positioned therebetween.

The outer periphery of the disc portion is provided with a flange 8 turned axially outwardly, that is, towards the outboard side of the wheel, the flange being secured to the rim portion under the axially outer bead seating region 5 by any suitable means such as rivetting, welding or adhesive bonding. The region 9 of the disc portion adjacent the flange is arranged to contact with adjacent side 10 of the rim well thereby locating the disc portion against axially inward movement relative to the rim portion. If desired, the region 9 of the disc may be secured to the adjacent side of the rim well to further increase the rigidity of the wheel.

The wheel construction described above is particularly suitable for use as a basic structural component in a decorative or "styled" composite wheel. FIG. 2 of the accompanying drawings shows a "styled" composite wheel in accordance with the present invention which basically comprises a wheel construction as shown in FIG. 1 with a plastics facing member 11 bonded or otherwise secured to the outboard face of the wheel disc and rim portions.

In the arrangement shown in FIG. 2 the disc and rim portions of the wheel are secured together solely by the plastics facing member which may be formed from a high density micro-cellular cast polyester and/or polyether polyurethane and extends over the entire outboard face of the disc portion of the wheel. If desired, the facing member may merely be of annular form extending solely in the vicinity of the joint between the disc and rim portions.

The facing member, which may alternatively be formed from any suitable plastics material with the necessary rigidity and strength, may be moulded "in situ" on the disc and rim portions or alternatively may be initially produced as a separate component and secured to the disc and rim portions by the use of adhesive, heat sealing or other suitable means.

Other materials suitable for use as the facing member include polyamides e.g., Nylon 6 and Nylon 66, polyphenylene oxide, acetal copolymers such as a copolymer of formaldehyde with trioxane and acetal homopolymers such as polyformaldehyde. If desired, these materials may be reinforced by filling with fibrous materials, e.g., glass, carbon etc.

The disc flange portion 8 may be provided with notches 12 or other suitable cut-outs to form keys for the plastics facing member.

The facing member may be shaped to incorporate the three-dimensional decorative features normally found on "styled" wheels such as cooling vents 13 which cooperate with apertures 14 in the wheel disc portion and central boss 15.

When the facing member extends across the entire outboard face of the disc portion apertures 16 are provided in the facing member corresponding with the apertures 2 provided in the disc portion to accommodate fixing nuts or studs. The apertures provided in the facing member for fixing nuts or studs may be "oversize" to allow sufficient clearance for the nuts or studs to engage the disc portion directly or alternatively bosses incorporated in the disc portion may protrude through the oversized apertures to enable the fixing nuts or studs to engage the disc portion of the wheel directly.

The composite wheel construction disclosed above possesses several advantages over the styled wheel constructions incorporating a decorative facing member hitherto employed. For example, the necessity for the welding or rivetting operations normally employed to join the wheel disc and rim portions is obviated. This is an important factor in achieving economies in production costs and also removes the necessity for manufacturing steps during which the wheel construction can become distorted.

As an alternative to the "styled" wheel construction described above the rim and disc portions may be secured together using conventional welding or rivetting techniques and the facing member used merely to give the desired "styled" appearance. When the disc and rim portions are joined together in this manner the facing member can be formed, if so desired, from a less structurally robust plastics material than when the plastics material is required to fulfill the dual functions of providing a decorative facing, and to secure the wheel rim and disc portions together. Thus a wide range of less dense polyurethane foam materials and foamed copolymers of acrylonitrile butadiene styrene may be used. Alternatively, non-cellular materials such as polypropylene, high density polyethylene and high impact styrene copolymers may be used.

The location of an outwardly turned flange on the disc portion under the axially outer tire bead seating region is an important feature of the construction of wheels in accordance with the present invention as this braces the wheel construction thereby keeping the wheel true, and the absence of any intrusion by the disc portion under the rim well provides improved clearance for mounting of associated braking units or other components in this region.

Having now described my invention - What I claim is:

1. A vehicle wheel comprising a rim portion provided with axially spaced circumferentially extending tire bead seating regions and a rim well region positioned therebetween; a central disc portion having an outer periphery provided with a flange turned axially outwardly towards the outboard side of the wheel, the flange being secured to the rim portion under the axially outer tire bead seating region; the disc portion adjacent the flange being located by the outboard side of the rim well against axially inward movement relative to the rim portion, a plastics facing member extending over at least a portion of the outboard face of the wheel disc and rim portions and covering the axially outwardly turned flange, the rim and disc portions being secured together solely by the plasics facing member.

2. A wheel according to claim 1 wherein the plastics facing member extends over the entire outboard face of the wheel disc portion.

3. A wheel according to claim 1 wherein the plastics facing member incorporates three-dimensional decorative features.

4. A wheel according to claim 1 wherein the facing member is formed from a high density micro-cellular cast polyester polyurethane.

5. A wheel according to claim 1 wherein the facing member is formed from a high density micro-cellular cast polyether polyurethane.

6. A wheel according to claim 1 wherein the facing member is formed from a high density micro-cellular cast polyester and polyether polyurethane.

7. A wheel according to claim 1 wherein the facing member is formed from a polyamide.

8. A wheel according to claim 1 wherein the facing member is reinforced by a filling of fibrous material.

9. A wheel according to claim 1 wherein the facing member is formed from an acetal homopolymer.

10. A wheel according to claim 9 wherein the facing member is formed from polyformaldehyde.

11. A wheel according to claim 1 wherein the facing member is formed from an acetal copolymer.

12. A wheel according to claim 11 wherein the facing member is formed from a copolymer of formaldehyde and trioxane.

13. The wheel of claim 1 in which the axially outwardly extending flange has notches to form keys for engagement with the plastics facing member.

* * * * *